(12) United States Patent
Nilsson et al.

(10) Patent No.: US 9,008,707 B2
(45) Date of Patent: Apr. 14, 2015

(54) METHOD AND ARRANGEMENT FOR REDUCING INTERFERENCE AND ENHANCING COVERAGE

(75) Inventors: Andreas Nilsson, Goteborg (SE); Fredrik Athley, Kullavik (SE); Patrik Persson, Grabo (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 220 days.

(21) Appl. No.: 13/808,448

(22) PCT Filed: Jul. 6, 2010

(86) PCT No.: PCT/EP2010/059612
§ 371 (c)(1),
(2), (4) Date: Jan. 4, 2013

(87) PCT Pub. No.: WO2012/003860
PCT Pub. Date: Jan. 12, 2012

(65) Prior Publication Data
US 2013/0109420 A1    May 2, 2013

(51) Int. Cl.
*H04W 52/24* (2009.01)
*H04B 7/02* (2006.01)
(Continued)

(52) U.S. Cl.
CPC ............ *H04W 52/243* (2013.01); *H04B 7/024* (2013.01); *H04B 7/0617* (2013.01); *H04B 7/0626* (2013.01); *H04W 52/143* (2013.01); *H04W 52/10* (2013.01); *Y02B 60/50* (2013.01)

(58) Field of Classification Search
CPC .... H04B 17/005; H04B 7/024; H04B 7/0413; H04B 7/0632; H04B 7/0634; H04I 1/0026; H04W 24/02
See application file for complete search history.

(56) References Cited

U.S. PATENT DOCUMENTS 8,359,042 B2 * 1/2013 Kim et al. .................. 455/452.2
8,537,879 B2 * 9/2013 Vitthaladevuni et al. ..... 375/146
(Continued)

FOREIGN PATENT DOCUMENTS

KR    20090079176 A    7/2009
WO    2009084904 A2    7/2009

OTHER PUBLICATIONS

Gangming LV et al., "A Distributed Power Allocation Algorithm with Inter-cell Interference Coordination for Multi-Cell OFDMA Systems", Global Telecommunications Conference, 2009, GLOBECOM 2009, Nov. 30, 2009 pp. 1-6.
(Continued)

*Primary Examiner* — Bobbak Safaipour
(74) *Attorney, Agent, or Firm* — Rothwell, Figg, Ernst & Manbeck, P.C.

(57) ABSTRACT

In a method of controlling downlink transmitting power and antenna coverage of base stations in a communication system, the system comprising a plurality of base stations and a plurality of user equipment each associated with at least one of the plurality of base stations, providing (S10) interference and noise information for each of at least a subset of the plurality of user equipment. Subsequently, identifying (S20) at least one interfering base station for at least one user equipment of the subset, and jointly analyzing (S30) the provided interference and noise information for the subset together with the identified at least one interfering base station. Finally, jointly adapting (S40) a transmitting power level and/or an antenna beam of the at least one identified interfering base stations based on the analysis, to provide reduced power consumption and increased coverage in the communication system.

3 Claims, 12 Drawing Sheets

(51) Int. Cl.
  *H04B 7/06* (2006.01)
  *H04W 52/14* (2009.01)
  *H04W 52/10* (2009.01)

(56) References Cited

U.S. PATENT DOCUMENTS

| | | | | |
|---|---|---|---|---|
| 8,605,803 | B2* | 12/2013 | Kuo et al. | 375/260 |
| 8,615,198 | B2* | 12/2013 | Han et al. | 455/63.1 |
| 8,750,890 | B2* | 6/2014 | Liu | 455/452.1 |
| 2004/0029558 | A1* | 2/2004 | Liu | 455/404.2 |
| 2004/0198408 | A1 | 10/2004 | Dillon et al. | |
| 2006/0223443 | A1 | 10/2006 | Reudink | |
| 2009/0215480 | A1* | 8/2009 | Kim et al. | 455/501 |
| 2013/0039184 | A1* | 2/2013 | Wigren | 370/235 |
| 2013/0109420 | A1* | 5/2013 | Nilsson et al. | 455/501 |
| 2013/0331136 | A1* | 12/2013 | Yang et al. | 455/501 |

OTHER PUBLICATIONS

Farrokh Rashid-Farrokhi et al., "Transmit Beamforming and Power Control for Cellular Wireless Systems", IEEE Journal on Selected Areas in Communications, vol. 16, No. 8, Oct. 1, 1998, pp. 1437-1449.

Catt, Ritt, "Inter-cell Interference Mitigation with Smart Antenna", 3GPP Draft, R1-050798, 3rd Generation Partnership Project (3GPP), Aug. 24, 2005, 6 pages.

Office Action issued on Dec. 2, 2014 in corresponding Chinese Application No. 201080067923.9, 9 pages (English translation only).

* cited by examiner ic networks in general, and particularly to methods for controlling output power, reducing cell interference, and increasing coverage in such networks.

METHOD AND ARRANGEMENT FOR REDUCING INTERFERENCE AND ENHANCING COVERAGE

CROSS-REFERENCE TO RELATED APPLICATIONS

This application is a 35 U.S.C. §371 National Phase Application from international application PCT/EP2010/059612, filed Jul. 6, 2010, and designating the United States. The above-identified application is incorporated by reference herein.

TECHNICAL FIELD

The present invention relates to communication networks in general, and particularly to methods for controlling output power, reducing cell interference, and increasing coverage in such networks.

BACKGROUND

The use of mobile phones and wireless broadband has increased rapidly during the last decade, and it is expected to grow even faster coming years. To meet these demands and stay competitive, the operators are forced to exploit every possibility to increase the capacity in their communication systems. One way to do this is to deploy more base stations and use smaller cells, which enables a higher frequency reuse and an increased capacity of the system. Unfortunately, with many small cells and dense deployment of base stations, the co-channel interference between different cells is increased. The large number of base stations also gives rise to a high energy consumption for the system as a whole which is not only expensive, but also has a negative effect on the environment.

Due to the above, manufactures of communication systems and equipment are faced with a number of difficulties that need to be overcome, one of which is the inter-cell interference caused by the dense deployment. One known way of decreasing inter-cell interference in a communication system is to use so called beam tracking. Beam tracking means that with help of an antenna array at a base station, the base station forms a narrow beam that tracks each individual user terminal. The direction of the tracking beam must be able to change quickly in order to track a user terminal; therefore the excitation weights of the antenna array that steer the beam are usually controlled by the base band. Since the beam towards the user terminal becomes narrower, less power will be directed towards other user terminals and therefore the interference will be reduced.

Another obstacle to master is to increase the coverage of the base stations of a communication system without necessarily increasing the transmit power of the base stations. One way to increase the capacity or coverage of a communication network is to use reconfigurable antennas at the base stations. A reconfigurable antenna is an antenna that can change its properties, by for example changing beam width, beam direction etc. With help of reconfigurable antennas, the base station can for example steer its beam towards hot spot areas, and therefore increase the Signal to Interference Noise Ratio (SINR) at the user terminals. Reconfigurable antennas usually do not need to change the beam as quickly as for beam tracking. The reconfigurable antenna usually just follows the traffic distribution of the user terminals and therefore may be needs to change the beam on minute or hour basis. Phase shifters and power amplifiers are usually used to shape different beams.

A further problem with existing communication networks is that the base stations often use unnecessary large transmit power when communicating with user terminals, without necessarily achieving better performance. The large transmit power used by the base station will contribute to a large signal power received by the user terminals, which of course is good for the performance. However, if the user terminals in the mobile communication system are interference limited instead of noise limited, the large transmit power of the base stations will also contribute to higher interference to other user terminals. This means that the high transmit power used by the base stations does not necessarily increase the SINR.

A known solution in prior art [1] presents a method of reducing the downlink transmission power level in a communication system. A user terminal measures and reports its noise and interference to a serving base station e.g. Node B. Based on the reported measurements, statistics are made and a decision is made whether to decrease or increase the transmitting power in the serving base station or not. This will change the coverage areas of the surrounding Node Bs, and potentially lead to handovers and load balancing. It is possible to include the surrounding Node Bs in the process of determining optimal power settings to avoid the above mentioned problems. However, in the case of noise limited adjacent cells this is not possible. The prior art then presents a load indicator. Unfortunately, this may lead to altering a planned power reduction or even abandoning the power reduction.

Consequently, there is a need for methods and arrangement for reducing transmission power, and in addition reducing the inter-cell interference, and also for improving overall coverage in a communication system.

SUMMARY

The present disclosure relates to downlink power control in communication systems.

An aspect of the present disclosure concerns methods and arrangements for controlling the downlink transmit power and at the same time improving coverage in a communication system.

A further aspect of the present disclosure concerns methods and arrangements for controlling downlink transmit power and adapting antenna beams of interfering base stations in a communication system.

In a further aspect of the present invention, a method of controlling downlink transmitting power and antenna coverage of base stations in a communication system, which system comprises a plurality of base stations and a plurality of user terminals each associated with at least one of the plurality of base stations, is presented. Accordingly, interference and noise information is provided for each of at least a subset of the plurality of user terminal, and at least one interfering base station for at least one user terminal of the subset is identified. Subsequently, the provided interference and noise information for the subset of user terminals is jointly analyzed together with the identified at least one interfering base station. Finally, a transmitting power level and/or an antenna beam of the at least one identified interfering base stations is adapted based on the analysis, to provide reduced power consumption and increased coverage in the communication system.

In an additional aspect of the present invention, an arrangement/system 1 for controlling downlink transmitting power and antenna coverage of base stations in a communication system, which communication system comprising a plurality of base stations and a plurality of user terminals each associated with at least one of the plurality of base stations is presented. Accordingly, the arrangement/system 1 includes means for providing interference and noise information for each of at least a subset of the plurality of user terminal, and means for identifying at least one interfering base station for at least one user terminal of the subset. In additional the arrangement/system 1 includes means for jointly analyzing the provided interference and noise information for the subset together with the identified at least one interfering base station. Finally, the arrangement/system 1 includes means for jointly adapting a transmitting power level and/or an antenna beam of the at least one identified interfering base stations based on the analysis, to provide reduced power consumption and increased coverage in said system.

In yet a further aspect of the present invention, a user terminal in a communication system, which system comprising a plurality of base stations and a plurality of user terminals each associated with at least one of the plurality of base stations, is presented. The user terminal includes means for measuring interference and noise information, and means for identifying at least one interfering base station, and means for reporting the information and the at least one interfering base station identity to a node in the communication system.

In another aspect of the present invention, a node in a communication system, which system comprising a plurality of base stations and a plurality of user terminals associated with at least one of said plurality of base stations, is presented. The node includes providing means configured for providing interference and noise information and the identity of any interfering base station for each of a subset of its associated user terminals. Further, the node includes relaying means configured for relaying the provided information and interfering base station identities to at least one other node in the system, and for receiving instructions of transmit power adaptations antenna beam adaptations in response to relaying the information. Finally, the node includes adapting means configured to adapt a transmit power of the node and/or adapt an antenna beam of the node in response to the received instructions.

In yet another aspect of the present invention, a base station controller in a communication system, which system comprising a plurality of base stations and a plurality of user equipment each associated with at least one of said plurality of base stations, is presented. The base station controller includes means for receiving and storing interference and noise information, and interfering base station identity for at least a subset of the user terminals, and means for jointly analyzing the received and stored interference and noise information for the subset of user terminals together with an identity of the identified at least one interfering base station. Finally, the base station controller includes means for jointly determining and adapting a transmitting power level and/or an antenna beam of the at least one identified interfering base stations based on the joint analysis, to provide reduced power consumption and increased coverage in the system.

A main advantage with the embodiments of the present invention is that the energy consumption for a mobile or wireless communication network or system will be reduced without affecting the performance noticeable. The coverage of the network will also increase. In addition, the interference will be reduced.

BRIEF DESCRIPTION OF THE DRAWINGS

The invention, together with further objects and advantages thereof, may best be understood by referring to the following description taken together with the accompanying drawings, in which.

DETAILED DESCRIPTION

The present disclosure will be described in the context of a mobile communication system, but can be adapted to any wireless communication system.

Figure 1:
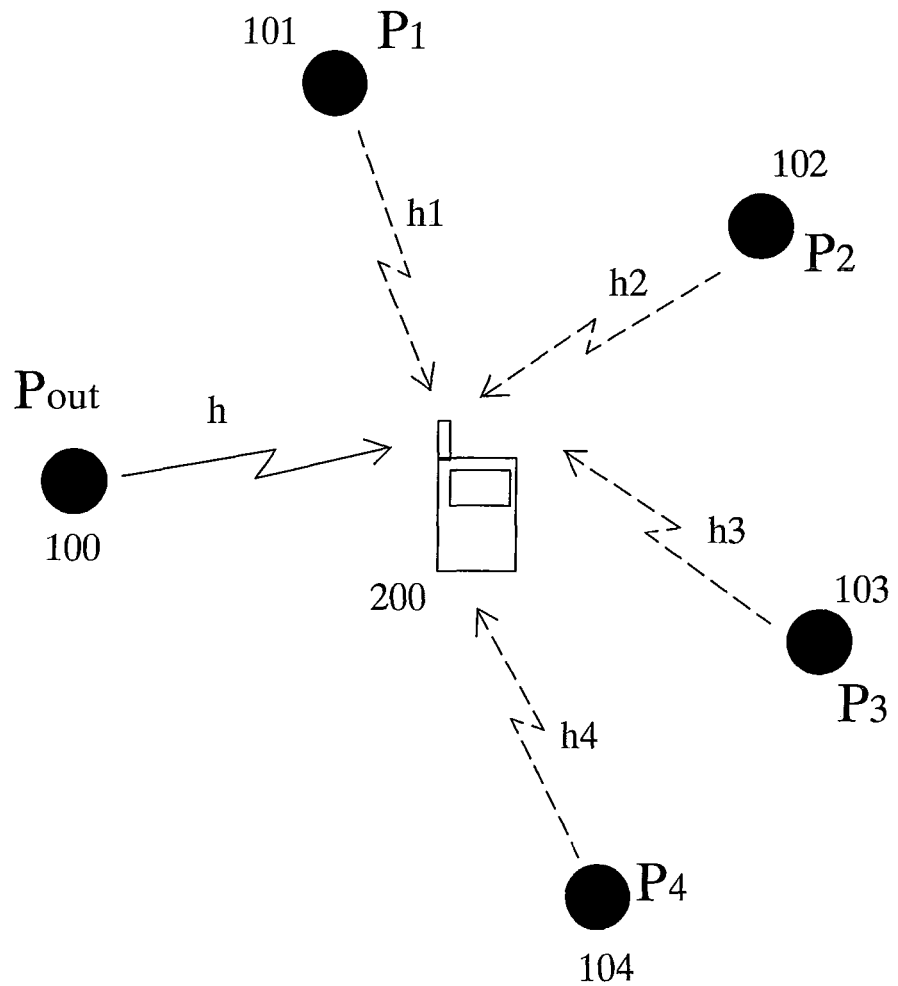
FIG. 1 is an illustration of prior art.

Consider the communication system 1 in FIG. 1, the system comprises a user terminal or user terminal 200 which is associated with a serving base station 100 e.g. Node B. In particular, the user equipment is interference limited, which means that the interference level is much larger than the noise level (i.e. the SINR only depends on the signal power and the interference power). Hence, if the signal power and the interference power are reduced with the same factor, the SINR is unchanged. To illustrate this, in the example of FIG. 1, the user terminal 100 is receiving transmissions from its serving base station 100, and the output power of the base station is $P_{out}$. In addition, four other base stations 101, 102, 103, 104 are causing interference at the user terminal 100, the output power of the interfering base stations are $P_1, P_2, P_3, P_4$ respectively. The SINR for the user terminal can be expressed according to Equation 1 below.

$$SINR = \frac{|h^2|P_{out}}{N_0 + \sum_{i=1}^{4} P_i|h_i^2|} \quad (1)$$

where SINR is the signal to interference ratio, h is the channel, $h_i$ is the channel for base station i, $P_i$ is the output power of base station i, $N_0$ is the noise. Since the user terminal 100 is interference limited, the noise level $N_0$ is assumed to be significantly lower than the interference level, and Equation 1 can be approximated as Equation 2 below:

$$SINR = \frac{|h^2|P_{out}}{\sum_{i=1}^{4} P_i|h_i^2|} \quad (2)$$

In this situation, reducing the transmission power for each base station 100-103 by a factor α, will not change the SINR, as can be seen in Equation 3 below.

$$SINR \approx \frac{|h^2|\alpha P_{out}}{\sum_{i=1}^{4} \alpha P_i |h_i^2|} = \frac{|h^2| P_{out}}{\sum_{i=1}^{4} P_i |h_i^2|} \quad (3)$$

where α≤1.

For further understanding of the benefits of the embodiments of the present invention, a prior art method [1] will be discussed below, with reference to FIG. 2 and FIG. 3.

Figure 2:
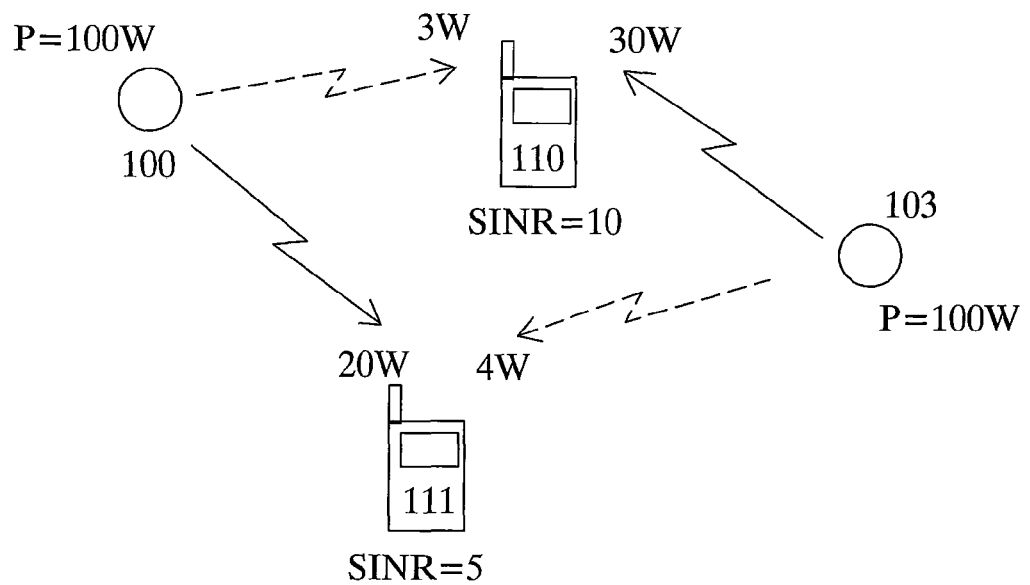
FIG. 2 is a further illustration of prior art.

In FIG. 2, a system comprises two user terminals e.g. mobile phones 110 and 111, each receiving transmissions from a respective serving base station 101, 100. The serving base station of one user terminal constitutes an interfering base station for the other user terminal. Base station 100 transmits with power 100 W to user terminal 111. The signal strength received at user terminal 111 from the base station 100 is 20 W. User terminal 111 also receives an interfering signal from base station 101, with signal strength of 4 W. Because the noise level is only 0.05 W, the SINR at user terminal 111, based on Equation 2, becomes 5. Base station 101 transmits with power 100 W to mobile 110. The signal strength received at user terminal 110 from base station 101 is 30 W. User terminal 110 also receives interference signal from base station 100, with the signal strength 3 W. Therefore, the SINR at user terminal 110, based on Equation 2, becomes 10.

Figure 3:
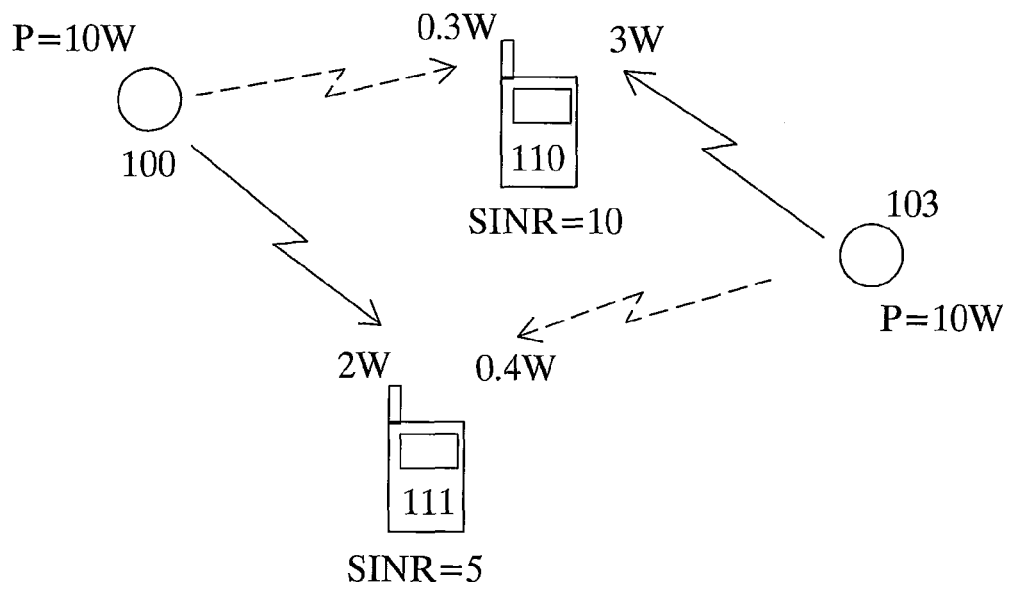
FIG. 3 is yet a further illustration of prior art.

In FIG. 3, the output power from each base station 110, 101 is changed from 100 W to 10 W. Consequently, base station 100 transmits with power 10 W to the user terminal 111. Thereby the signal strength received at mobile phone 111 from the base station 100 is 2 W. User terminal 111 also receives an interference signal from base station 101, which has the strength of 0.4 W. Since the noise level is only 0.05 W the SINR at user terminal 111 still becomes 5. Base station 101 now transmits with power 10 W to the user terminal 110. The signal strength received at mobile phone 110 from base station 101 is then 3 W. User terminal 101 still receives an interference signal from base station 100, which now has the strength 0.3 W. Therefore, the SINR for user terminal 110 still becomes 10. As can be seen the output power been reduced with 90% from FIG. 2 to FIG. 3 without decreasing the SINR of either mobile phone, e.g. a=0.9 in Equation 3.

There are a few problems concerning the above discussed power control method. For example, the user terminals do not send any information regarding from which base station the interference originates. This makes it very hard for the communication network to determine what base stations are eligible for reducing its output power without deteriorating the performance of other user terminals. Another issue with the concept of prior art [1] is that the base stations only have the functionality of changing the output power.

In order to alleviate the above described problems, a basic aspect of the embodiments of the present invention enables jointly controlling the output power and/or the antenna beam shape and direction of interfering base stations in a communication system. This is enabled by providing information for one or more of the user terminals in the communication system concerning whether the user terminals are interference limited or noise limited, a geographical location e.g. area or direction of the user terminal, and the identity of one or more interfering base stations for each user terminal.

Consequently, in general words, each user terminal in a communication system is configured to investigate if it is interference limited or noise limited and from which base station(s) the interference originates, e.g. the identity of the interfering base station(s). Then, the user terminal provides or transmits the information to the base station or an intermediate node it is in communication with. That base station e.g. serving base station then communicates with the surrounding base stations, and/or a central base station unit, and finds out if it is possible to reduce the output power of any base stations in any frequency band without affecting the SINR of any user terminal significantly. The base stations or base station controller also saves statistics of in which geographical area (direction) user terminals that are interference limited are and where the noise limited user terminals are by using beam tracking or similar method. If there is an area where there is a lot of interference limited user terminals, and another area with a lot of noise limited user terminals, there is a possibility that a base station can reshape its beam from the interference limited area towards the noise limited area using reconfigurable antennas, and therefore increase the coverage and reduce the likelihood of inter cell interference.

Figure 4:
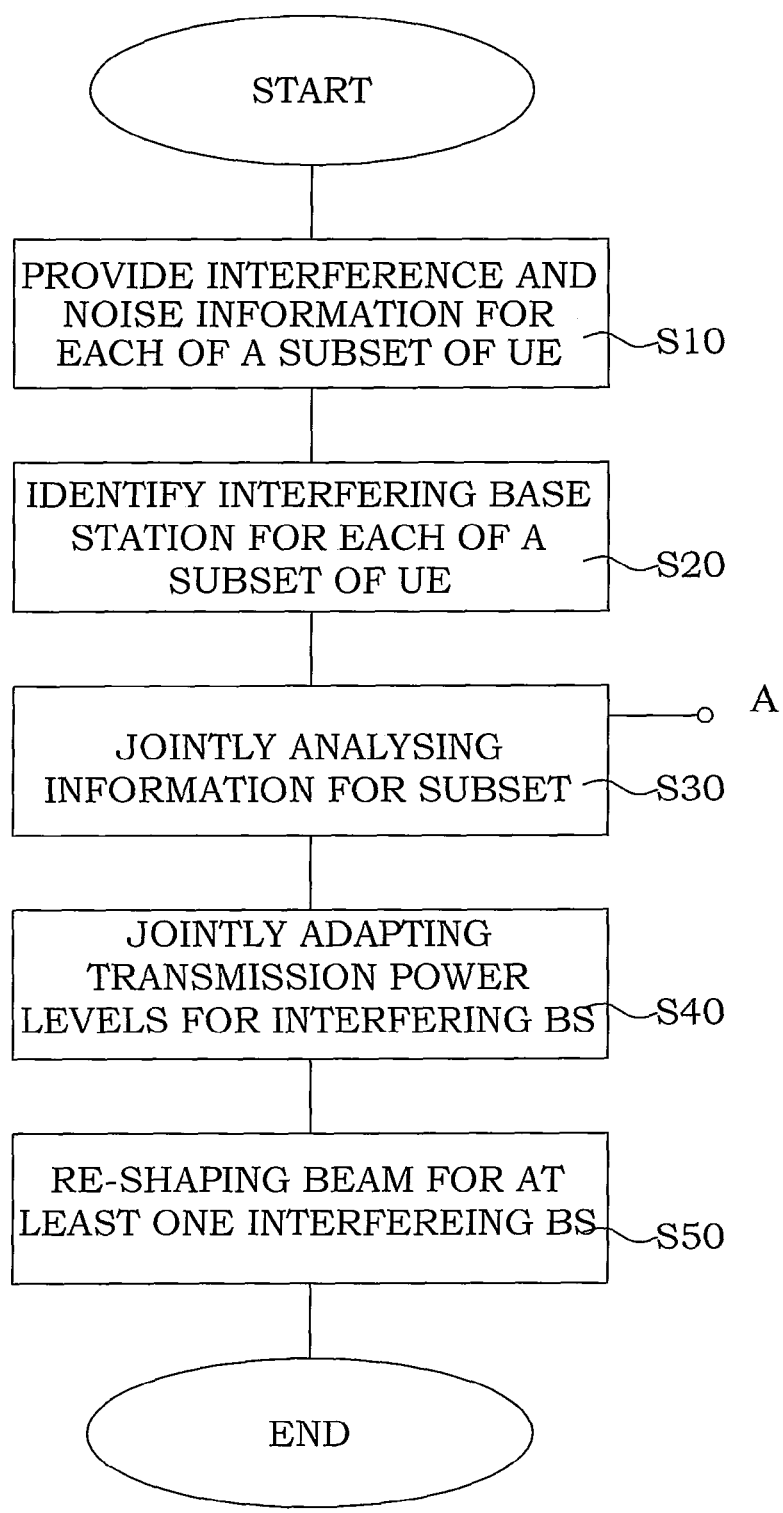
FIG. 4 is a schematic flow diagram of an embodiment of a method according to the present invention.

With reference to FIG. 4 an embodiment of a method according to the present invention will be described. Consider a communication system e.g. mobile phone system or other wireless communication system, which comprises a plurality of base stations and a plurality of user equipment each associated with at least one of the plurality of base stations. In order to enable control of the downlink transmitting power and the antenna coverage of the base stations in the communication system, interference, and noise information is provided S10 for each of at least a subset of the plurality of user equipment. Typically, the information supports determining if the user terminal is interference limited or noise limited, in addition information concerning the geographical location of the user terminal is provided. In addition, at least one interfering base station is identified S20 for at least one of the user terminals in the subset. Potentially, according to a further embodiment, a list of interfering base stations in descending order based on their impact on the performance of the user terminal can be provided.

The provided interference and noise information, geographical location, and identified interfering base station(s) are collected and stored and jointly analyzed S30 e.g. statistics are collected. Finally, based on the analysis the transmitting power level and/or an antenna beam of one or more of the at least one identified interfering base stations is adapted S40 to provide reduced power consumption and increased coverage in the system.

It is evident that an identified interfering base station for one user terminal is the serving base station for another user terminal. Consequently, the transmitting power level and/or antenna beam is adapted for interfering base stations as well as for serving base stations.

As stated above, with the embodiments of the present invention the base station also have the functionality of beam shaping with help of a reconfigurable antenna. With beam shaping at the base stations, it is possible to redirect an antenna beam from areas with statistically high rate of interference limited user terminals towards areas with statistically high rate of noise limited user terminals, and therefore increase the coverage and reduce the inter cell interference.

Figure 5:
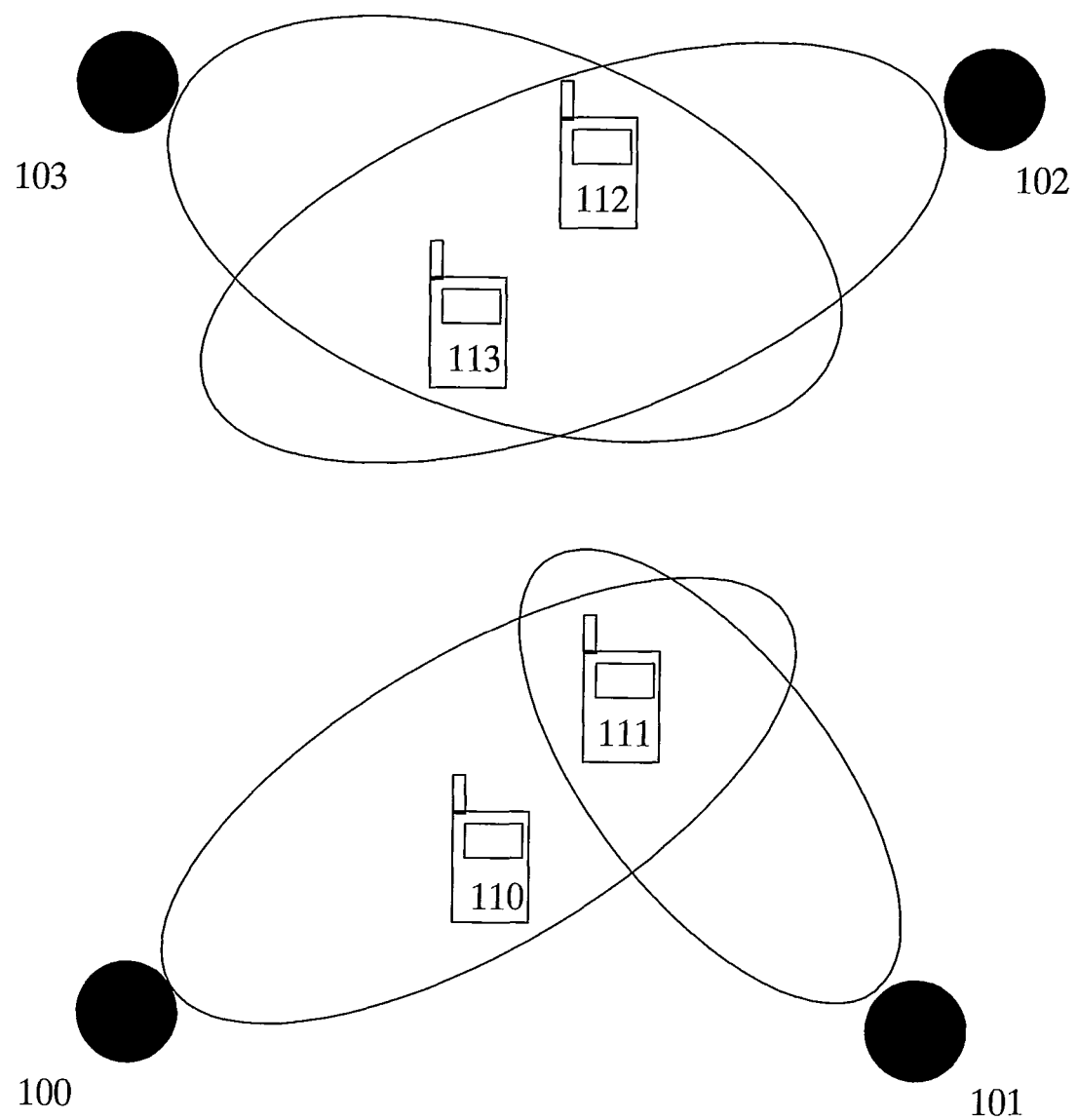
FIG. 5 is an illustration of a system where the present invention is applicable.

With reference to FIG. 5, the advantages and benefits of the present invention will be described.

FIG. 5 illustrates a scenario where the gain of the present invention over the concept in prior art [1] is clearly seen. In FIG. 5 a communication system, comprising four user terminals 110, 111, 112, 113 or mobile phones, and four base stations 100, 101, 102, 103 is illustrated. There four base stations 100-103, are communicating with one user terminal each 110-113. Base station 100 is communicating with user terminal 110, base station 101 is communicating with user terminal 111, base station 102 is communicating with user terminal 112, and base station 103 is communicating with user terminal 113. User terminals 111-113 are interference limited and user terminal 110 is noise limited. User terminal 111 receives interference from base station 100, user terminal 112 receives interference from base station 103, and user terminal 113 receives interference from base station 102.

Without any knowledge about which base station that interferes with which user terminal, it is impossible to know which base stations that can safely reduce their output power without deteriorate the performance of any user terminal In prior art [1] a load indicator is used trying to keep track of the load balancing in the cells, based on statistics only. Hence, in prior art [1] there is no information about which base station that interferes with which user terminal making it difficult to find an optimal power setting. It would be necessary to test to reduce the output power of all base stations 100-103, but then the SINR of the user terminal 110 will be reduced and therefore the output power of the base station must be increased to the initial output power again. Therefore, the concept in prior art [1] is not useful in cases like the one shown here. However, with the concept of the present invention, the base stations will get information of which base stations that interferes with which user terminals, and therefore the base stations can easily find out that only the base stations 102 and 103 can reduce their output power without deteriorating the performance of any user terminal.

Figure 6:
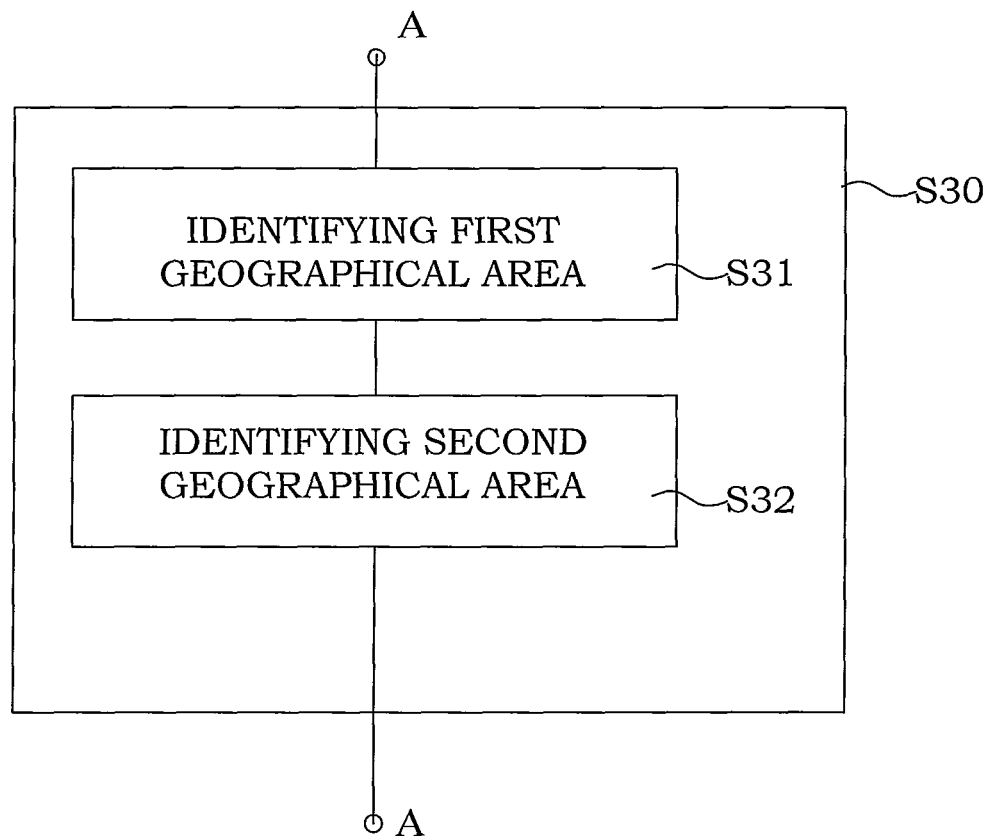
FIG. 6 is a schematic flow diagram of a further embodiment of the method according to the present invention.

With reference to FIG. 6 a further embodiment of the present invention will be described, particularly concerning the concept of beam shaping. Consequently, the step S30 of analyzing the provided data includes the further step of identifying S31 a first geographical area or direction comprising a first group of predominantly interference limited user equipment. This is possible based on the joint statistics of the geographical location of where all user terminals and the provided interference and noise information for each user terminal. Further, at least a second geographical area or direction comprising a second group of predominantly noise limited user equipment is identified S32.

Subsequently, the antenna beam of at least one identified interfering bases station is re-shaped S40 or re-directed away from the first geographical area and towards the at least one second geographical area. In this manner, the interference limited user terminals will be subjected to a reduced interference, whilst the noise limited user terminals will experience a stronger signal and consequently better signal quality.

Figure 7:
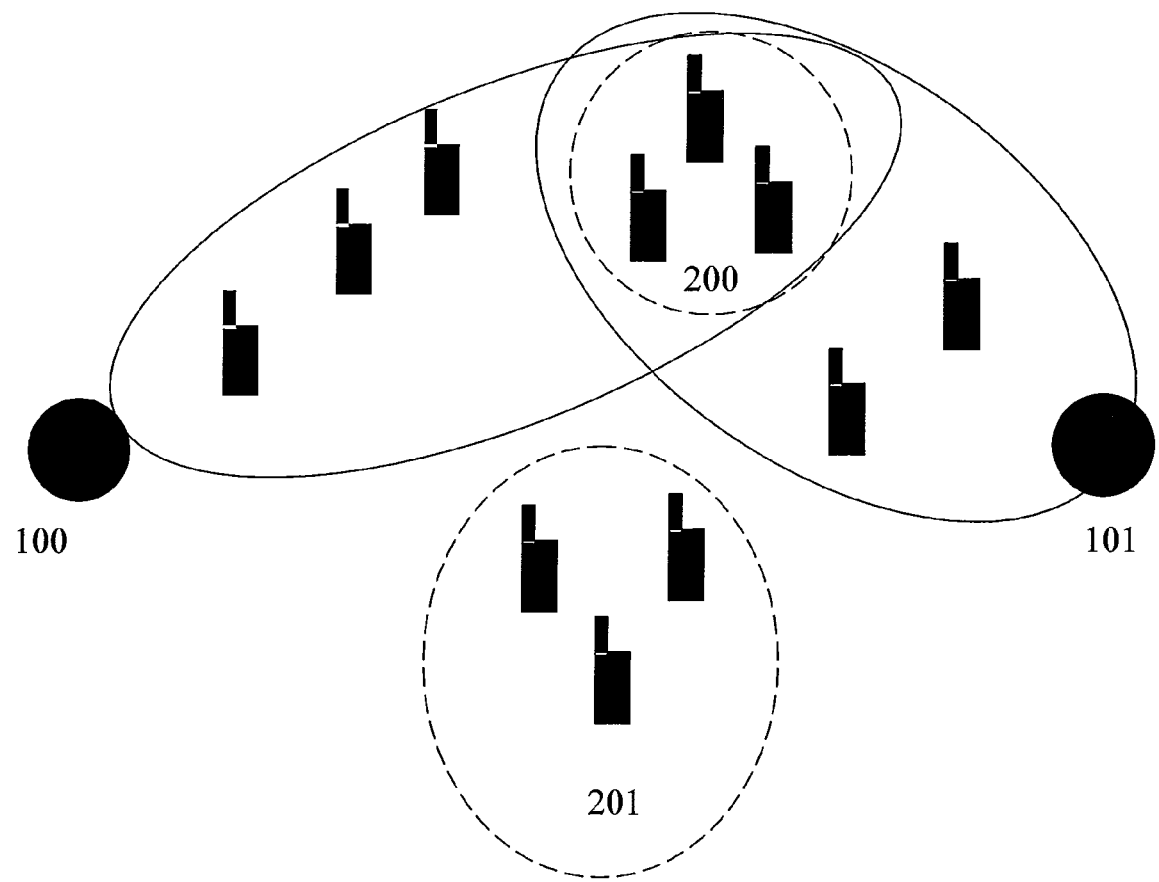
FIG. 7 is an illustration of an embodiment of the present invention.

A further example of the use of controlling power and reconfiguring an antenna beam of at least one interfering base station, according to embodiments of the present invention, is illustrated in FIG. 7. The system in FIG. 7 comprises two base stations 100, 101 and a plurality of user terminals in communication with either one of the two base stations. Within the system a group 200 of user terminals comprising predominantly interference limited user terminals are affected by the antenna beam of both base stations, in addition a second group 201 of user terminals comprises predominantly noise limited user terminals. Each user terminal in the system measures and provides information S10 about its interfering base stations and information about its noise or interference limitations. The base stations 100 and 101 save information of where the user terminals are and whether the user terminals are interference limited or noise limited using beam tracking. The base stations 100 and 101 also save information of which base station that interferes with which user terminal (but that is not necessary here because there are only two base stations in the example). With help of all this information, the base stations can find out S20, S30 that there is high statistical chance that user terminals within the area 200 are interference limited and that user terminals in area 201 are noise limited. Consequently, it is possible to identify a first geographical area or direction in which in which a plurality of interference limited user terminals 200 are located, and a second geographical area or direction in which a group of noise limited user terminals 201 are located.

Typically, according to one embodiment, the information is stored and analyzed in a central control node e.g. base station controller in the communication system. Consequently, the base station controller orders the base station(s) to adapt their transmit power and/or antenna beam based on the analysis. However, according to a further embodiment, the same functionality could be implemented in part or fully in a base station itself.

Figure 8:
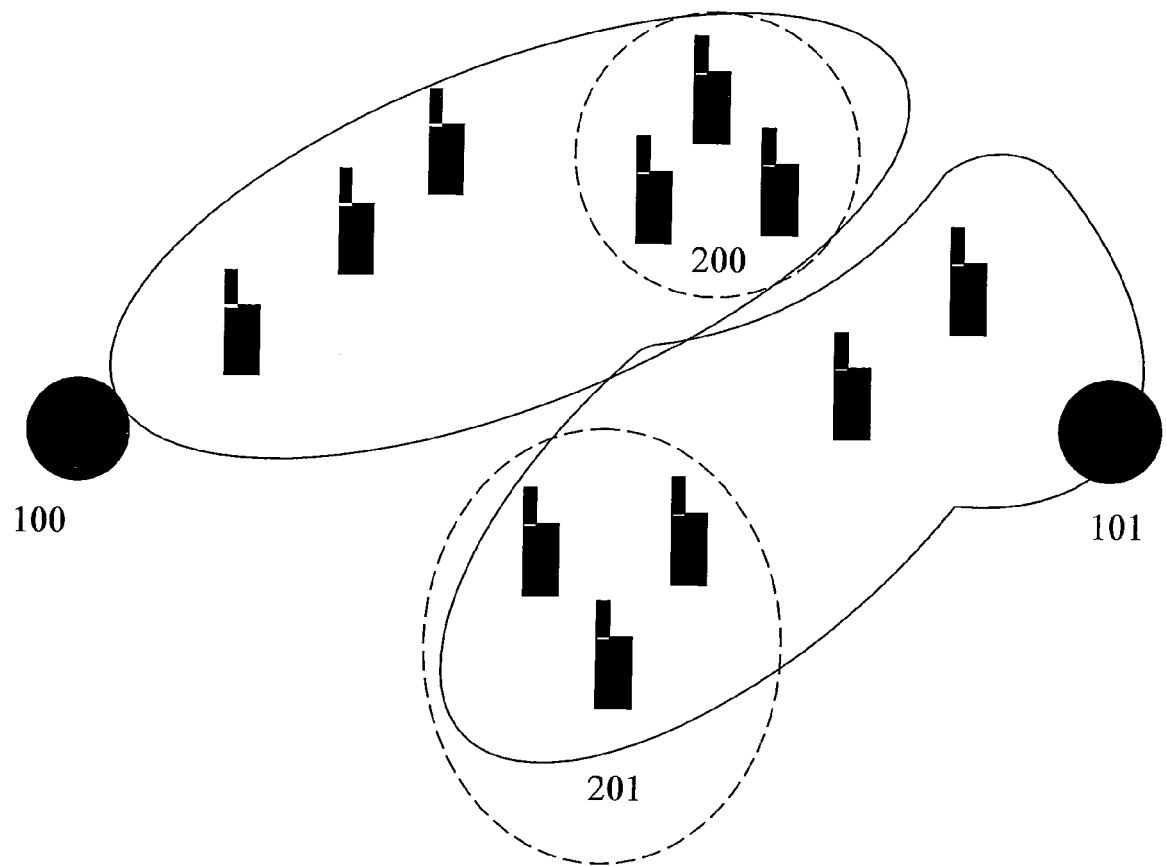
FIG. 8 is a further illustration of an embodiment of the present invention.

Subsequently, it is possible to order one of the interfering base stations, in this case base station 101, to reshape or reconfigure S40 its antenna beam away from the first geographical area and towards the second geographical area, this is illustrated in FIG. 8. Therefore one base station (base station 101 in the example) can re-shape its beam from the interference limited area towards the user terminals in area 201 which were noise limited. This gives better coverage and less inter-cell interference. With the concept from prior art [1] albeit is not possible to shape the beams of the base stations, only reduce/increase the output power, therefore it is not possible to change the coverage in a case like this.

In this manner, the interference for the interference limited user terminals 200 is reduced and the coverage of the base station e.g. system is increased. It is possible to reconfigure the antenna such that is affects the lobe width, tilt, lobe direction, lobe shape of the antenna beam.

Figure 9:
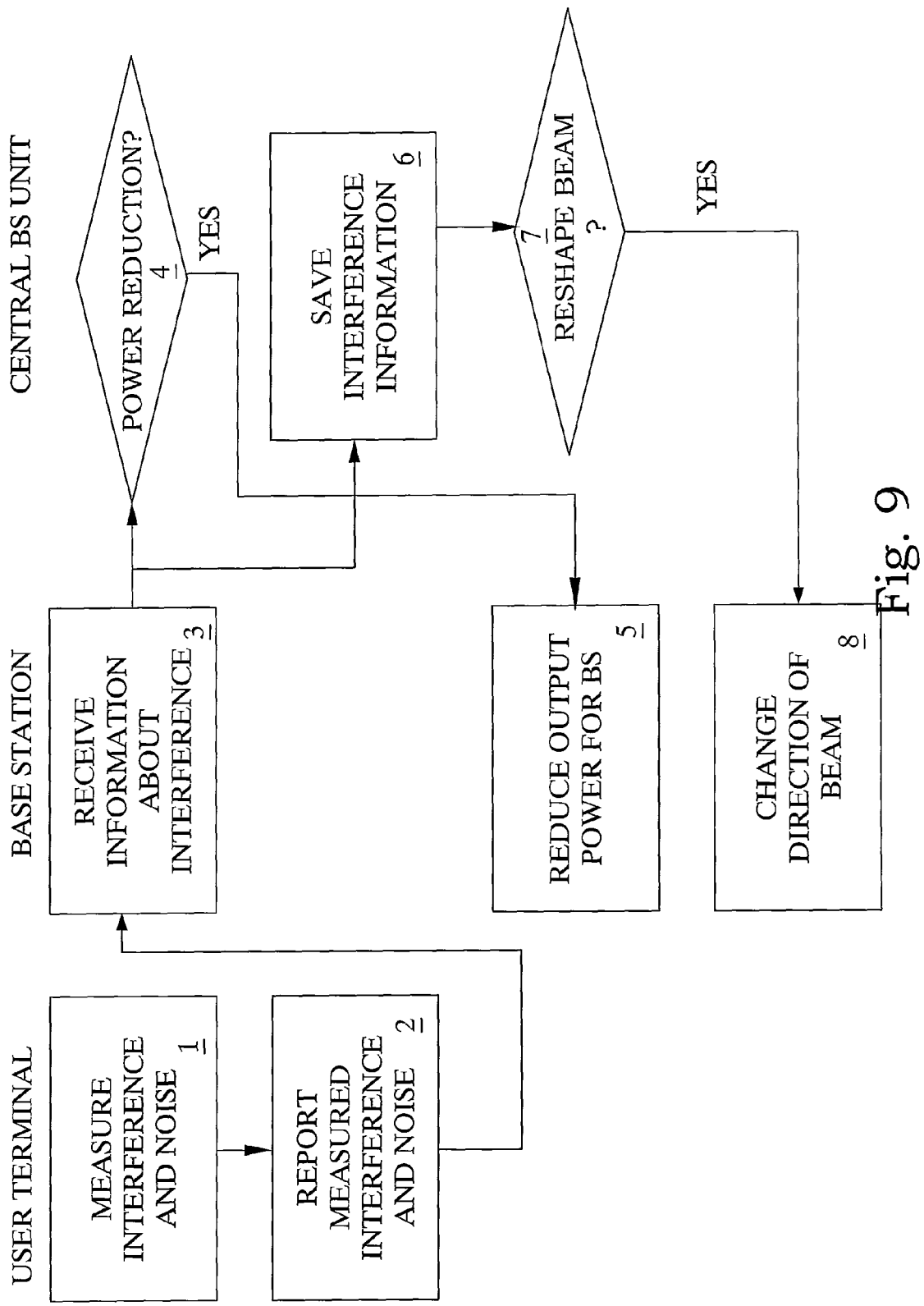
FIG. 9 is a schematic flow diagram of an embodiment of the present invention.

With reference to FIG. 9, an embodiment of the method according to the present invention will be discussed. In this case, the communication system and the different steps of the method are illustrated by a user terminal, a base station, and a base station controller.

In step 1, the user terminal measures its noise and interference level, and then makes a decision if the received signal is noise or interference limited. The user terminal also detects from which base stations the interference come from, e.g. identifies at least one interfering base station, typically a major interfering base station or a list of interfering base stations. In step 2, the user terminal informs its serving base station (the base station the user terminal is currently communicating with) that the user terminal is noise limited or interference limited and from which base stations the interference comes. In step 3, the base station receives the information regarding the interference for the user terminal. The base station also finds the directions to the user terminals with which it is communicating. This can easily be done when the base station uses beam tracking. The information of where the user terminal is and if the user terminal is noise or interference limited and from which base station the interference comes from is then sent or communicated to a central base station unit. In step 4, the central base station unit determines if there are any base stations that can reduce their transmission power without affecting the performance of any user terminals and in case of also determine how much these base stations can reduce their transmission power. If it is possible to reduce the transmission power of any base station without deteriorate the performance of any user terminals, the central base station unit informs the base stations of interest. In step 5, the base stations of interest reduce their transmission power with the recommended amount that was determined by the central base station unit.

In step 6 the central BS unit saves the information regarding the interference and noise levels of the user terminals, in which direction the user terminals are in relation to the base station and from which base station the interference comes from. In step 7, the central base station uses this saved information to make statistics about in which directions there are many interference limited user terminals and where there are many noise limited user terminals. If there are any directions where there are a large statistic chance of many interference limited user terminals and a nearby area where there is a high probability of many noise limited user terminals, the central base station unit investigates if it is possible to re-shape the beam of any of the involved base stations. Then the interference levels will decrease and the coverage of the network will increase. The central base station unit informs the base stations of interest and in step 8, the base stations of interest re-shape their beams.

Figure 10:
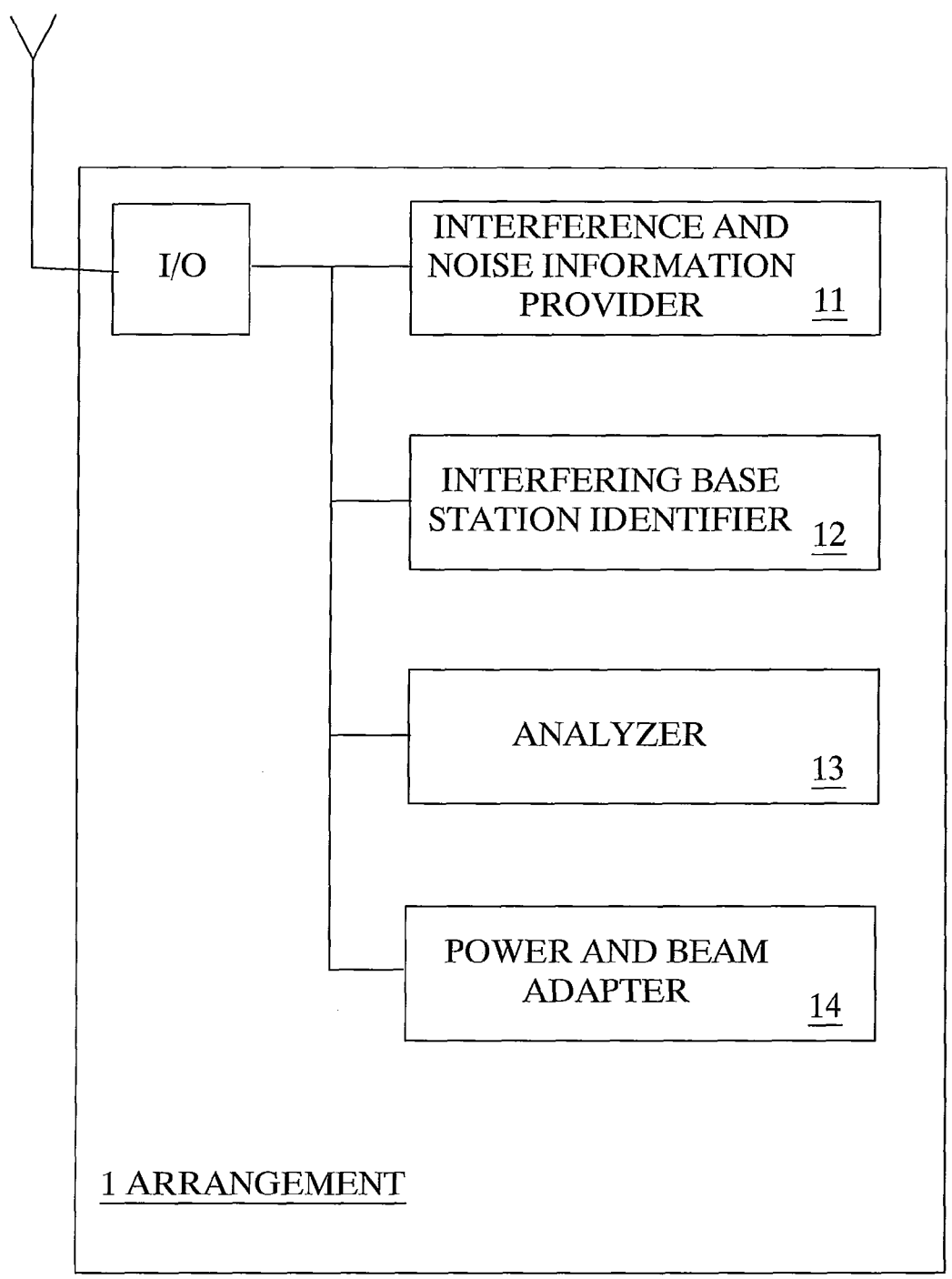
FIG. 10 is a schematic block diagram of an embodiment of a system according to the present invention.

With reference to FIG. 10, an embodiment of a system/arrangement 1 for controlling downlink transmitting power and antenna coverage of base stations in a communication system according to the present invention will be described. The system includes a provider 11 e.g. providing unit, for providing interference and noise information for each of at least a subset of the plurality of user equipment, and an identifier 12 e.g., identifying unit, for identifying at least one interfering base station for at least one user equipment in the subset. Further, the system 1 includes an analyzer 13 e.g. analyzing unit, for jointly analyzing the provided interference and noise information for the subset together with the identified at least one interfering base station. Finally, the system 1 includes an adapter 14 e.g. adapting unit for jointly adapting a transmitting power level and/or an antenna beam of the at least one identified interfering base stations based on the analysis, to provide reduced power consumption and increased coverage in the communication system.

Figure 11:
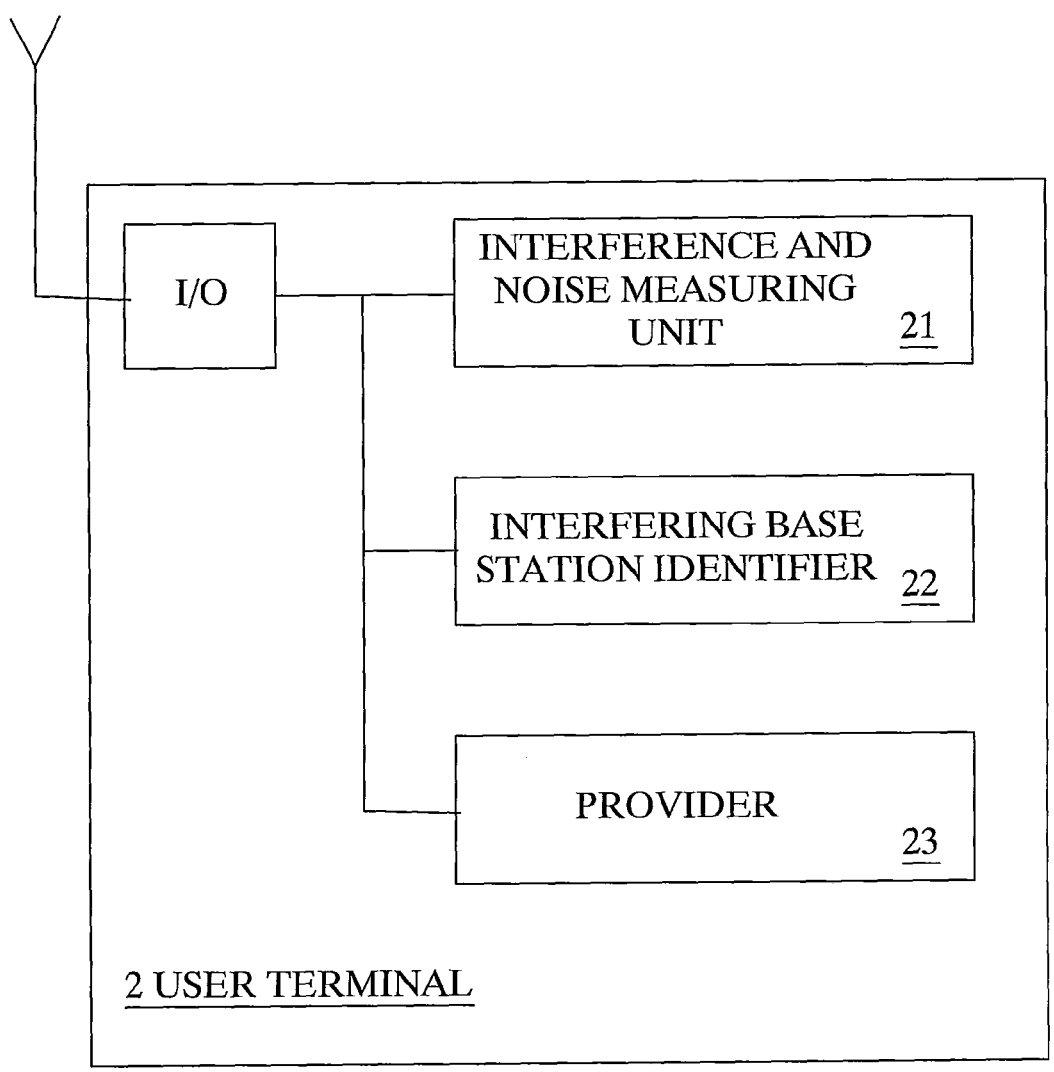
FIG. 11 is a schematic block diagram of an embodiment of a user terminal according to the present invention.

With reference to FIG. 11, a user terminal 2 includes a measuring unit 21 for measuring and determining interference and noise information of a received signal from a base station. The measuring unit 21 is typically configured for measuring the interference and noise, and subsequently comparing the two and determining if it is interference limited or noise limited. Further, the user terminal includes an identifier 22 e.g. identifying unit for identifying 22 any or at least one interfering base station causing interference in received signals. Finally, the user terminal includes a provider 23 e.g. providing unit for providing the information and the identity of the at least one interfering base station to a node in the communication system. The user terminal 2 can be a mobile phone, personal computer, PDA, laptop or other wireless equipment adapted to receive signals from nodes e.g. base stations in a communication system. Although not disclosed, the user terminal 2 includes all well known and necessary functionality to receive, decode, encode, and transmit signals from and too base stations.

Figure 12:
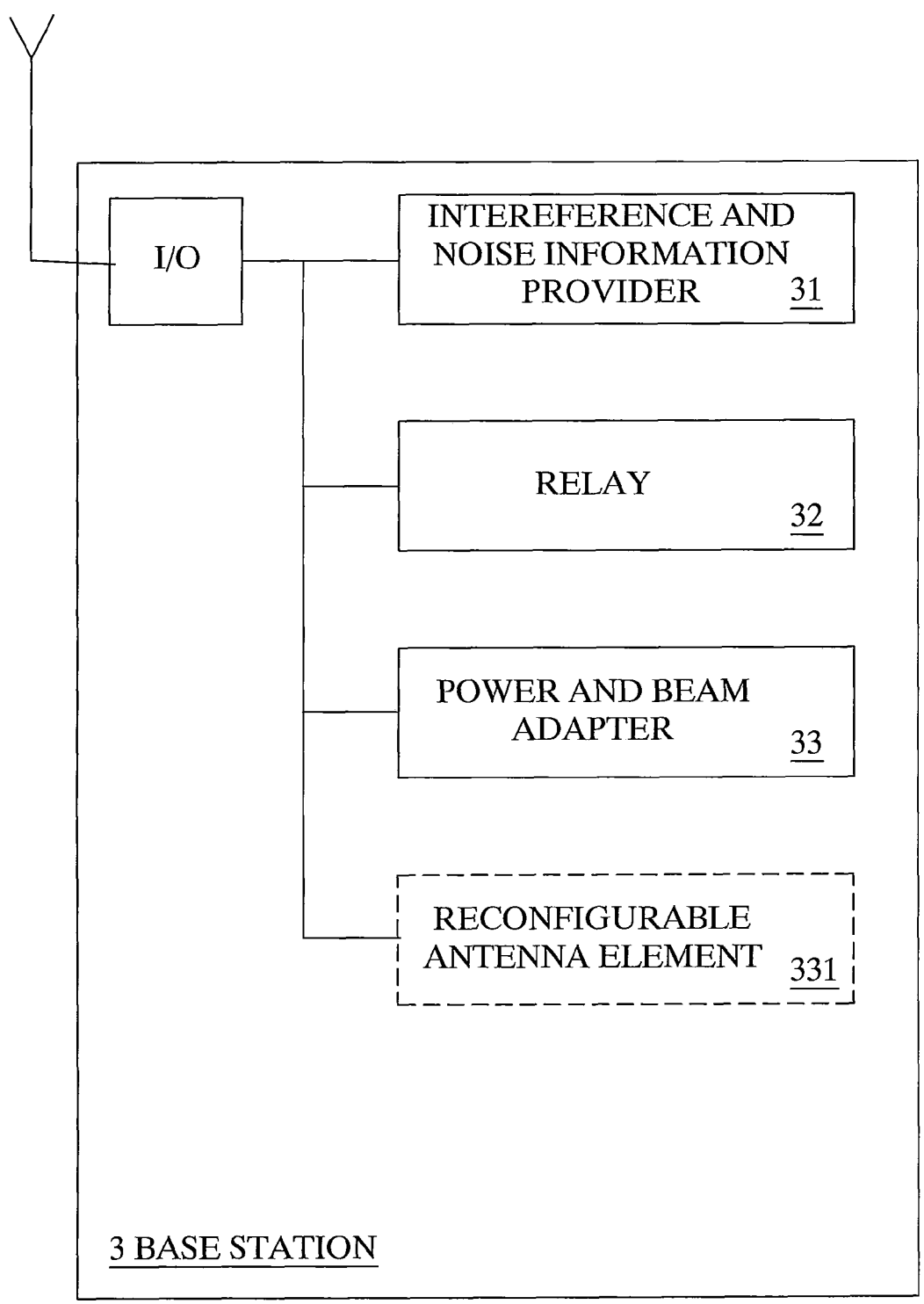
FIG. 12 is a schematic block diagram of an embodiment of a base station according to the present invention.

With reference to FIG. 12, an embodiment of a node 3 e.g. base station or base station transceiver, in a communication system according to the present invention will be described. The node 3 includes a provider 31 configured for providing interference and noise information and the identity of any interfering base station for each of a subset of its associated user terminals. Typically, the provider 31 is adapted for receiving such information and identities of interfering base stations from the associated user terminals. However, it is possible to receive the information from some other node in the system, or by the node itself performing measurements and providing the information and identities. In addition, the node includes a relay e.g. relaying unit 32 configured for relaying the provided information and interfering base station identities to at least one other node in the system, typically to a base station controller node, and for receiving instructions of transmit power adaptations antenna beam adaptations in response to relaying said information. For some systems it might be beneficial to communicate the information directly to other base stations in the system. Further, the node 3 includes an adapter 33 configured to adapt the transmit power of the node and/or adapt the antenna beam of the node in response to instructions received from a central control node e.g. base station controller. The adapter 33 is configured to control at least one reconfigurable antenna element 331 in the node, which antenna element 331 is configured to be reconfigurable in response to at least a joint analysis of interference and noise information and interfering base station identity for all of a subset of user equipment in the system.

The reconfigurable antenna element 331 is reconfigurable to change at least one of lobe width, lobe tilt, lobe direction, lobe shape of an antenna beam.

Figure 13:
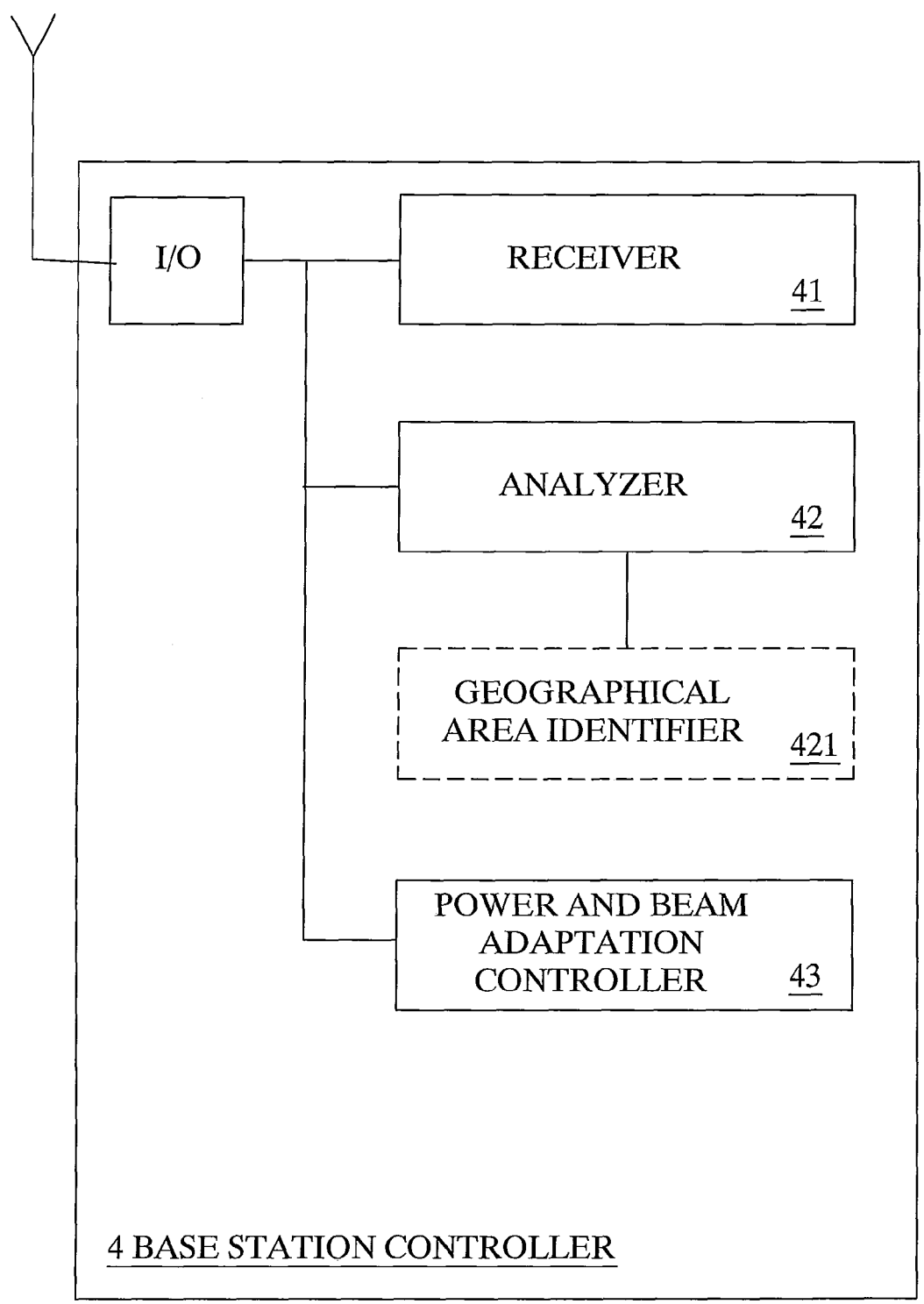
FIG. 13 is a schematic block diagram of an embodiment of a base station controller according to the present invention.

With reference to FIG. 13, an embodiment of a central control node 4 e.g. base station controller 4 according to the present invention in a communication system will be described. The central control node 4 includes a receiver 41 e.g. receiving unit for receiving and storing interference and noise information, and interfering base station identity for each of at least a subset of user terminals, from a plurality of base stations. Further, the control node 4 includes an analyzer 42 e.g. analyzing unit for jointly (and statistically) analyzing the received and stored interference and noise information for the subset of user terminals together with the identified at least one interfering base station. In addition, the control node 4 includes an adapter 43 for determining and adapting a transmitting power level and/or an antenna beam of the at least one identified interfering base stations based on the joint analysis, and instructing the interfering base stations of their respective adaptation to provide reduced power consumption and increased coverage in said system.

According to a further embodiment, the analyzer 42 includes an identifier 421 for identifying a first geographical area or direction comprising a first group of predominantly interference limited user equipment, and for identifying at least a second geographical area or direction comprising a second group of predominantly noise limited user equipment.

The steps, functions, procedures, and/or blocks described above may be implemented in hardware using any conventional technology, such as discrete circuit or integrated circuit technology, including both general-purpose electronic circuitry and application-specific circuitry.

Alternatively, at least some of the steps, functions, procedures, and/or blocks described above may be implemented in software for execution by a suitable processing device, such as a microprocessor, Digital Signal Processor (DSP) and/or any suitable programmable logic device, such as a Field Programmable Gate Array (FPGA) device.

It should also be understood that it might be possible to re-use the general processing capabilities of the network nodes. For example this may, be performed by reprogramming of the existing software or by adding new software components.

The software may be realized as a computer program product, which is normally carried on a computer-readable medium. The software may thus be loaded into the operating memory of a computer for execution by the processor of the computer. The computer/processor does not have to be dedicated to only execute the above-described steps, functions, procedures, and/or blocks, but may also execute other software tasks.

A main advantage with the embodiments of the present invention is that the energy consumption for a mobile or wireless communication network or system will be reduced without affecting the performance noticeable. The coverage of the network will also increase. In addition, the interference will be reduced.

REFERENCES

[1] "Transmission power reduction in interference limited nodes", US Patent Application US 2009/0239569 A1, Sep. 24, 2009.

The invention claimed is:

1. A method of controlling downlink transmitting power and antenna coverage of base stations in a communication system, said system comprising a plurality of base stations and a plurality of communication devices, each of which is associated with at least one of said plurality of base stations, comprising:
    providing interference and noise information for each of at least a subset of said plurality of communication devices,
    identifying at least one interfering base station for at least one communication device of said subset;
    jointly analyzing said provided interference and noise information for said subset of said plurality of communication devices together with said identified at least one interfering base station, said analyzing step comprising the step of identifying a first geographical area or direction comprising a first group of predominantly interference limited communication devices, and identifying at least a second geographical area or direction comprising a second group of predominantly noise limited communication devices, and
    jointly adapting a transmitting power level and an antenna beam of said at least one identified interfering base station based on said analysis, to provide reduced power consumption and increased coverage in said system, said step of adapting the antenna beam comprises re-shaping an antenna beam of at least one identified interfering base station away from said first geographical area and towards said at least one second geographical area.

2. An arrangement for controlling downlink transmitting power and antenna coverage of base stations in a communication system, said communication system comprising a plurality of base stations and a plurality of communication devices each associated with at least one of said plurality of base stations, the arrangement being configured to:
    obtain interference and noise information for each of at least a subset of said plurality of communication devices,
    identify at least one interfering base station for at least one user equipment of said subset;
    jointly analyze said provided interference and noise information for said subset together with said identified at least one interfering base station to identify a first geographical area or direction comprising a first group of predominantly interference limited communication device and at least a second geographical area or direction comprising a second group of predominantly noise limited communication device,
    adapt a transmitting power level of said at least one identified interfering base stations based on said analysis, and
    re-shape an antenna beam of at least one identified interfering base station away from said first geographical area and towards said at least one second geographical area.

3. A base station controller in a communication system, said communication system comprising a plurality of base stations and a plurality of communication device each associated with at least one of said plurality of base stations, comprising:
    a receiver for receiving interference and noise information, and interfering base station identity for at least a subset of said user terminals; and
    a data storage for storing the received interference information, noise information, and interfering base station identity, wherein the base station controller is configured to:
    jointly analyze said received and stored interference and noise information for said subset of user terminals together with an identity of said identified at least one interfering base station,
    identify a first geographical area or direction comprising a first group of predominantly interference limited user terminals,
    identify at least a second geographical area or direction comprising a second group of predominantly noise limited user terminals,
    jointly determine and adapt a transmitting power level of said at least one identified interfering base stations based on said joint analysis, and
    re-shape an antenna beam of at least one identified interfering base station away from said first geographical area and towards said at least one second geographical area.

* * * * *

UNITED STATES PATENT AND TRADEMARK OFFICE
CERTIFICATE OF CORRECTION

PATENT NO. : 9,008,707 B2  Page 1 of 1
APPLICATION NO. : 13/808448
DATED : April 14, 2015
INVENTOR(S) : Nilsson et al.

It is certified that error appears in the above-identified patent and that said Letters Patent is hereby corrected as shown below:

In the Specification

In Column 4, Line 41, delete "user terminal 100" and insert -- user terminal 200 --, therefor.

In Column 4, Line 44, delete "user terminal 100," and insert -- user terminal 200, --, therefor.

In Column 4, Line 57, delete "user terminal 100" and insert -- user terminal 200 --, therefor.

Signed and Sealed this
Eighth Day of September, 2015

Michelle K. Lee
*Director of the United States Patent and Trademark Office*